Nov. 3, 1931.  S. Z. KOCHANOWSKI  1,829,834
POTATO DIGGER
Filed Nov. 12, 1928    2 Sheets-Sheet 2

Inventor
S. Z. Kochanowski,
By Market Clerk
Attys.

Patented Nov. 3, 1931

1,829,834

UNITED STATES PATENT OFFICE

STANISLAW ZYGMUNT KOCHANOWSKI, OF WARSAW, POLAND

POTATO DIGGER

Application filed November 12, 1928, Serial No. 318,939, and in Poland July 26, 1928.

The present invention relates to a potato-digging machine in which a side-hill plough share co-operates with a potato-stalk removing device.

The object of the invention is to improve the working of such machines in such a way that the potatoes are obtained as free as possible from stalk and earth.

Figure 1:
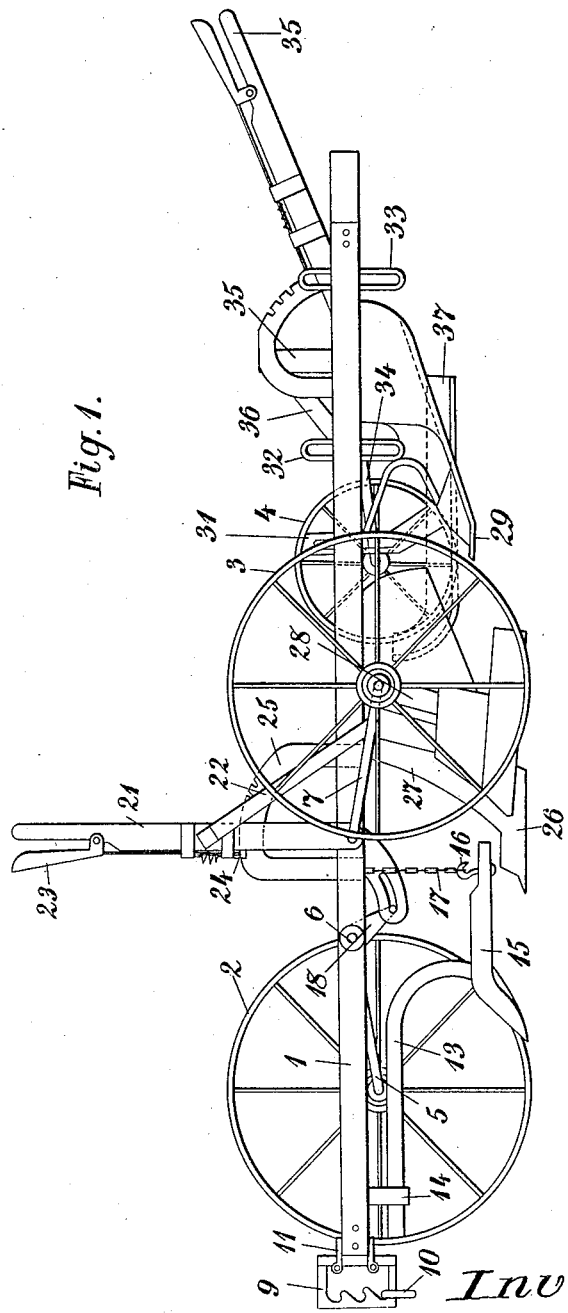
Figure 2:
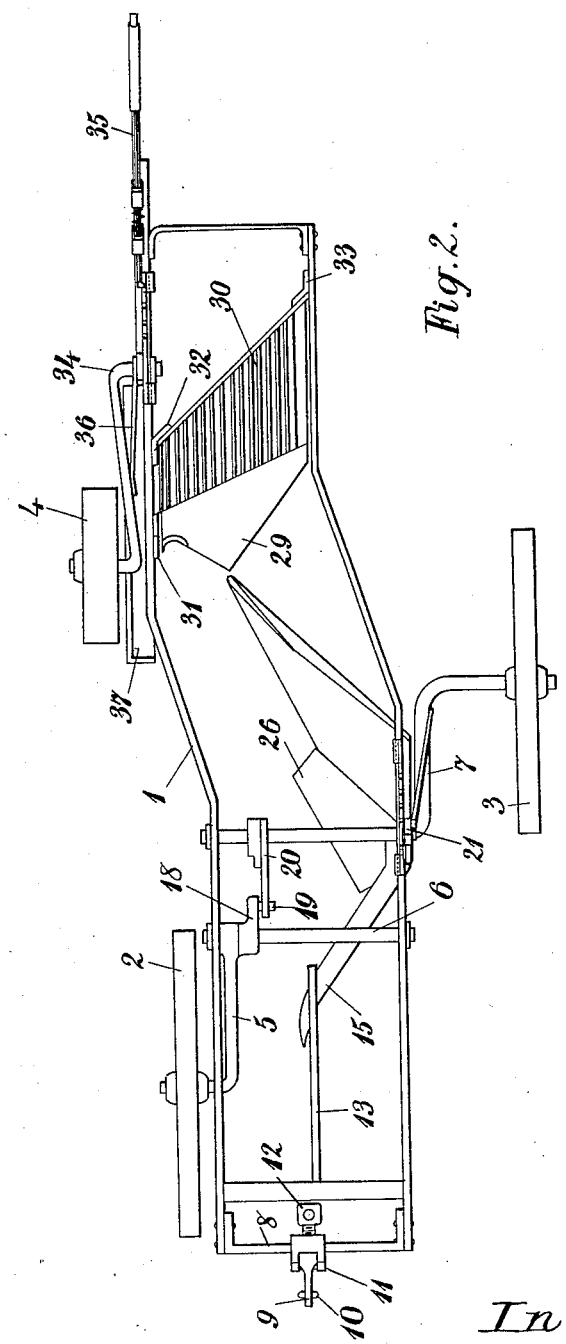

The invention is illustrated by way of example in the accompanying drawings, wherein Figures 1 and 2 show the actual digger in side elevation and in plan respectively.

The digger consists of a frame supported upon two large wheels 2 and 3 and a small wheel 4. The wheel 2 revolves about an arm 5, which is keyed on to an axle 6, while the wheel 3 revolves about an arm 7, which serves at the same time as an axle and is rotatably supported in a frame 1. Upon a cross beam 8 of the frame 1 is arranged a controlling mechanism, which is composed of a small frame 9 provided with notches for the reception of a chain link 10, and of a shackle 11 embracing the small frame 9 and the cross beam 8. A screw 12 serves for exerting a suitable pressure upon the cross beam 8 and the shackle 11. To a longitudinal beam 13 on an angle iron 14 is secured a claw 15 suspended by means of a hook 16 and a chain 17 from the frame 1. Upon the axle 6 is keyed a lever 18, the roller 19 of which engages in a slot in a lever 20 keyed to the axle 7. Upon the axle 7 is arranged a lever 21, which is rigidly connected with the axle 7 by means of a rod 22. A handle 23 with an automatic catch 24 is secured to the lever 21. The catch can drop into suitable recesses in a guide bar riveted to the frame 1. A plough share 26 is rigidly connected with the frame 1 by means of two flat iron members 27 and 28. In the rear portion of the frame 1 is arranged a second plough share, which consists of a sheet-metal share 29, and the active surface of which is constructed of bars 30 forming an apertured mold board. This plough share can be adjusted in height, and is provided for this purpose with three clamps, having notches 31, 32 and 33. The wheel 4 revolves about an axle 34 supported in a stationary position in the frame 1, and upon the axle 34 is arranged a bent lever 35, which is rigidly connected with the axle by means of a connecting piece 36. With the axle 34 is associated a plough shoe or pressure shoe 37, the lower edge of which remains permanently in the same horizontal plane as the lower edge of the wheel 4. A link mechanism for this purpose is omitted from the drawings for the sake of clearness.

The potato digger operates in the following manner:—

The controlling mechanism enables horses to be harnessed to it. The small frame 9 is slidably arranged on the transverse beam 8, and the chain link 10 can be placed in suitable notches in the frame 9, whereby the displaceability of the point of application of the force acting is rendered possible within certain limits, together with the balancing of the resistance when digging. As already mentioned, the plough 26 is virtually integral with the frame 1, which has the result that the adjusting of the action of the plough is effected by lowering or raising the frame, and at the same time the plough. For this purpose the handle 23 of the lever 21 has to be pressed, and the catch 24 has to be caused to leave the recess in the guiding bar. By displacing the lever the axle 7 is positively rotated, as the rod 22 forms a connecting member between the lever 21 and the axle 7. Consequently the axle 7 revolves in the frame and pulls the lever 20, in the curved guide of which the roller 19 slides. The guide is so shaped that when rotating it produces the same angles of rotation of the axles 7 and 6, whereby the frame is lowered and raised exactly horizontally. The lever 35 serves for lowering or raising the wheel 4, which during the field labour, rolls upon the strip of earth turned over and during transport in the street forms the third point of support of the digger.

The digging operation proceeds in the following manner:—

The stalk-displacing claw 15 turns the stalks to the left and presses them down. Then the front plough share 26 turns the potato bank or hill over to the right, with dirt, potatoes, stalks and all. The plough shoe or pressure shoe 37 slides on to the stalks and holds them down. Then the rear ploughshare 29 takes up the overturned potatoes and all or part of the overturned dirt, according to its depth of penetration, which is determined by adjusting the clamps with notches 31, 32 and 33, and turns the said potatoes and dirt over to the left on to the apertured mold board or grid 30 while the plough shoe or pressure shoe 37 and the wheel 4 are still holding the ends of the stalks. Thus the potatoes are pulled off from the stalks, and then the dirt sifts and falls out through the grid 30, and the potatoes fall back on to the ground off the rear end of the grid 30, and may be gathered up by hand or by the machine.

The advantages of the above construction are as follows:—

(1) Reliability of operation, occasioned by the omission of delicate or complicated mechanisms of any kind which would be likely to fail under the severe conditions of field labour.

(2) Simplicity of operation.

(3) Cheapness of the construction, which consists exclusively of ordinary commercial iron sections.

(4) Lightness of construction and consequent saving of driving power.

What I claim is:—

1. A potato-digging machine, comprising a digging plough, a plough share provided on the digging plough and adapted to dig out potatoes by turning over a strip of earth towards the right, a second plough share provided on the digging plough somewhat behind and to the right of the first-mentioned plough share and at a somewhat higher level, and adapted to turn over a strip of earth towards the left, a claw arranged in front of the first-mentioned plough share and adapted to push potato stalks aside, a plough shoe adapted to hold fast the stalks pushed aside by the claw, the second plough share being also adapted to tear off the potatoes from the stalks held fast by the plough shoe.

2. A potato digger, comprising a plough share adapted to turn a potato bank over, a stalk-displacing claw arranged in front of the said plough share and adapted to deflect the potato stalks toward that side of the digger on which the unharvested potato plants are located while the said plough share is turning the potato bank over, a second plough share somewhat behind and to one side of the first-mentioned plough share, the said second plough share being adapted to take the potato bank up again and turn it towards the furrow produced by the front plough share, an apertured mold board attached to the second plough share, and a pressure shoe arranged laterally of the rear plough share and adapted to hold fast the stalks while the second plough share is taking up the potato bank again.

In testimony whereof I have signed my name to this specification.

STANISLAW ZYGMUNT KOCHANOWSKI.